Aug. 9, 1927.

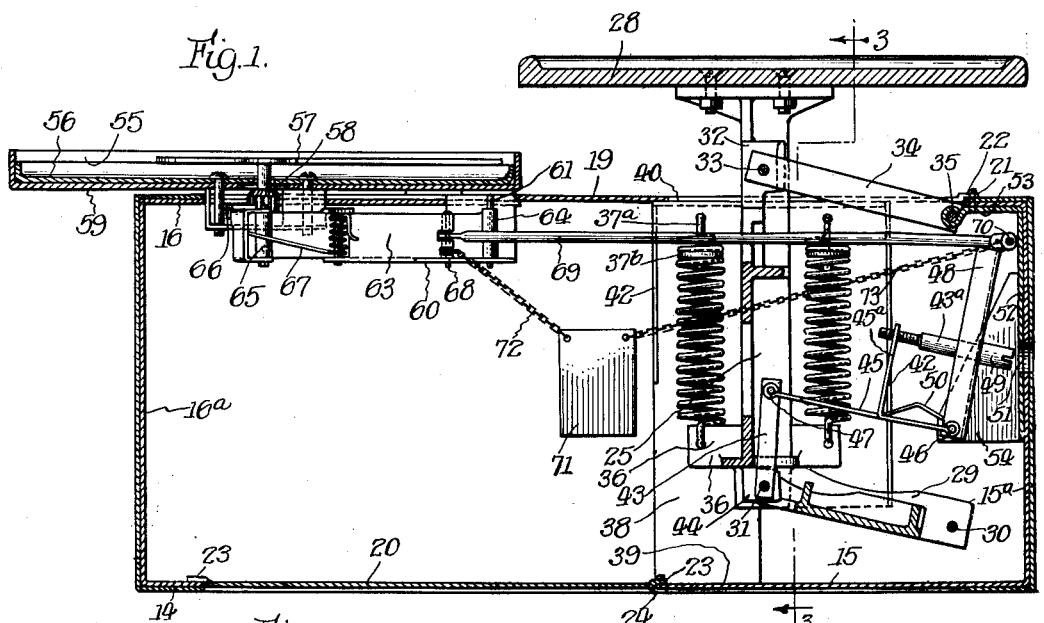
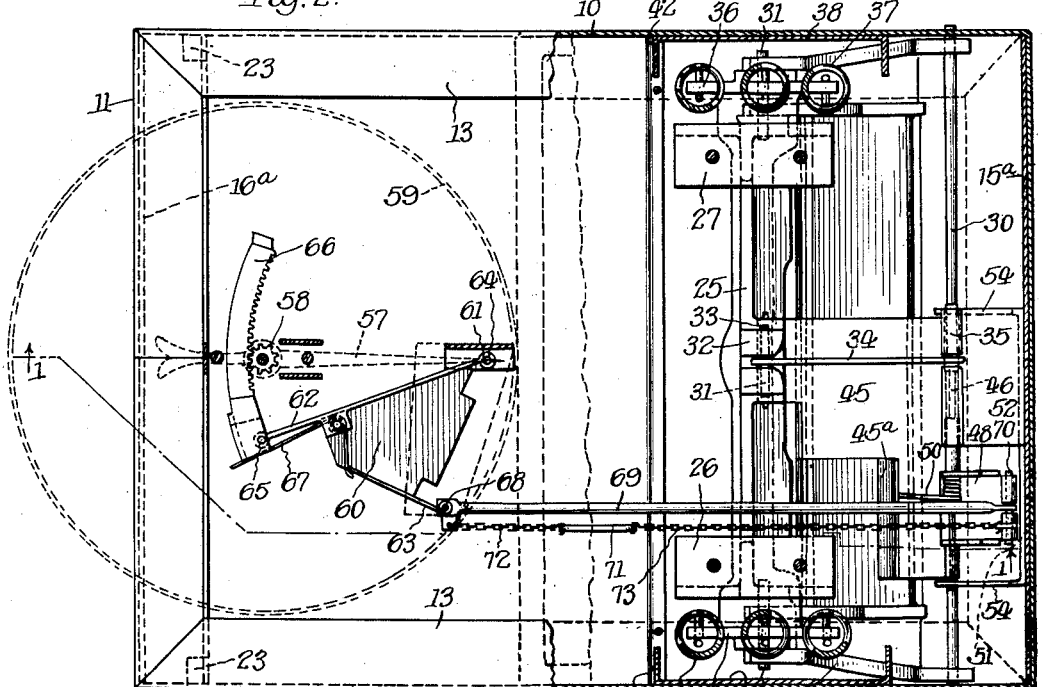

M. H. HANSEN

PLATFORM SCALE

Filed July 14, 1924

Inventor:
Marius H. Hansen,
By Chindahl Parker Carlson
Attys.

Patented Aug. 9, 1927.

1,638,260

UNITED STATES PATENT OFFICE.

MARIUS H. HANSEN, OF CHICAGO, ILLINOIS.

PLATFORM SCALE.

Application filed July 14, 1924. Serial No. 725,791.

This invention relates to platform scales and particularly to a low box type of scale specially suitable for private use as in homes and the like.

One object of the invention is to produce a reliable and inexpensive scale of the so-called bathroom type.

Another object is to provide a construction permitting rapid and simple factory adjustment thereof.

Still another object is the provision of a construction suitable to sustain and register accurately an unbalanced load on its platform.

Other and ancillary purposes and advantages will be found in the following description of the exemplary embodiment of my invention which is shown in the accompanying drawings in which:

Figure 1 represents a longitudinal cross-section of the scale along the line 1—1 of Fig. 2.

Fig. 2 is a horizontal section of the scale substantially along the box top.

Figure 3:
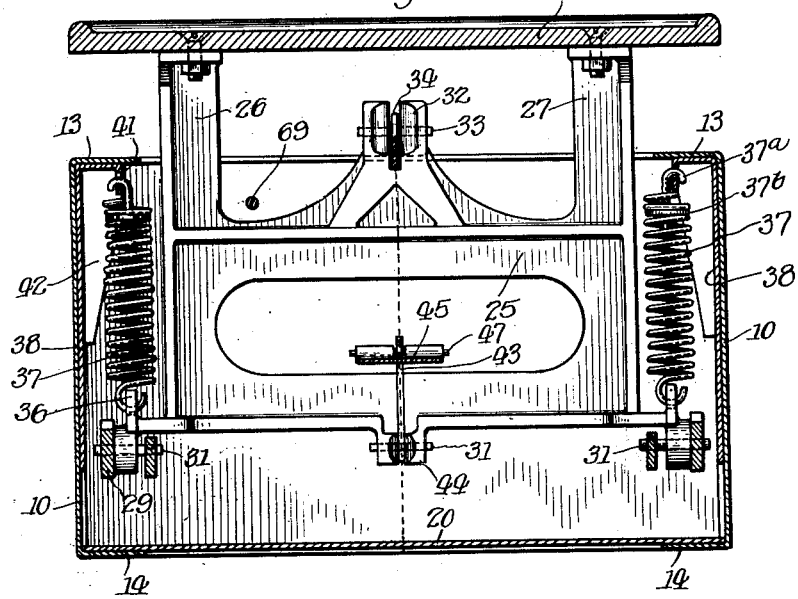
Fig. 3 is an end view along the plane of line 3—3 of Fig. 1.
Figure 4:
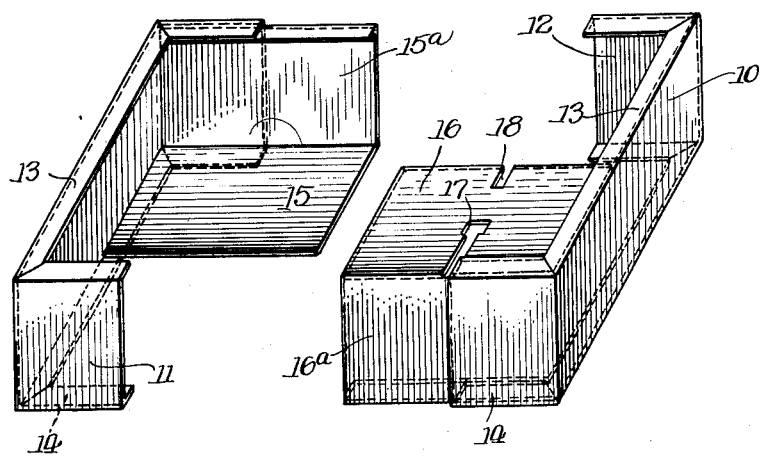
Fig. 4 is a view showing the box construction.

In the drawings the scale mechanism is shown housed in a box casing having at one end a weighing mechanism and at the other a registering mechanism. The box is of specially simple and rigid construction being formed from stampings of sheet steel, bent to the desired form and spot welded. The construction of the box is indicated in Fig. 4 showing two similar side sections, which when separated divide the box longitudinally into two similar portions. Each side section comprises one long side-face 10, and half of the two end-faces 11 and 12. Each face has rectangular flanges 13 and 14 all around at top and bottom directed internally of the box. The section described is readily made from a single strip of material by bending the same into the form of a channel, cutting opposing V's in the channel sides and bending again in the line of the V's to form the corners. Wide L-plates 15 and 16, constituting half of the bottom surface and half of the top surface, respectively, are provided diagonally of the box to hold the side sections together. The L-plates 15 and 16 have parts 15ª and 16ª which are inside the ends of the box to provide rigidity. The end faces 11 and 12 may be spot welded to the L-plates. The half-bottom plate 15 is solid, leaving an opening at one end of the box. The half top plate 16 is slotted at 17 and 18 for the registering mechanism, leaving the top open at the opposite end for insertion of the weighing mechanism. Suitable removable plates 19 and 20 serve to close the respective top and bottom openings (Fig. 1). The top plate 19 has a suitable lip 21 thereon through which securing means as screw 22 secures it to the box. The bottom plate 20 is suitably secured in the bottom opening by the bending of properly located lips as lips 23 and 24.

The scale mechanism located at the front of the box comprises a frame 25 vertically suspended in the box. The frame has stems 26 and 27 projecting up through the box which support a platform 28. A parallelogram arrangement of other members maintains the frame vertical. The parallelogram comprises a bottom frame plate 29 pivoted on rod 30 passing through the box sides, and pivoted to the vertical frame 25 at 31. The frames 25 and 29 are heavy and substantial cast iron pieces. In the frame 25 a forked projection 32 extends through the top of the box into which is pivoted at 33 a single link 34 parallel to frame 29 and pivoted to the box structure at 35. These parts complete the parallelogram.

The suspension of the main weighing frame 25 is made by one or more springs at each side of the frame and herein preferably located at the ends. Each end of the frame 25 carries transversely thereto a bar 36 located at the lower end. Three springs 37 are here used to suspend the frame at each side, the springs extending from the bars 36 to the top of the box. As a means for strengthening the box for support of the springs, a special supporting plate 38 is constructed into the box extending from the bottom plate 15 as shown in Fig. 1 at 39 to the top flange 13 at 40, the plate being suitably secured, as by rivets or spot welding. The plate at the top is bent over inwardly of the box and then downwardly to provide a vertical rib 41 for attachment of the springs 37. Suitable side brackets 42 are bent laterally from the plate to help support the rib 41.

In a scale having this arrangement of the springs at each end of the frame 25 it is quite likely that a load at one side only will cause greater deflection at that side and hence error in registration. Since registration is dependent upon deflection I aim to surmount this difficulty by registering the deflection of the central part of the frame. With an unbalanced load unequal deflection of the two sides will cause the same deflection at the center as if the load were balanced.

For the registration mechanism there is provided a link 43 secured to the frame 25 in its vertical center line. The link is pivotally secured on the pivot line 31 in a bifurcated projection 44 of the frame. A plate 45 is pivoted at 46, rigid with the casing, said pivot being located in the fixed side of the parallelogram in the line of pivots 30 and 35. The link 43 is pivoted at 47 in the forward end of said plate, said pivot also being located in the parallelogram side 31—33. A portion of the plate 45 is made upstanding as at 45ª. A channel plate 48 is likewise pivoted at 46 and is substantially parallel to the part 45ª. A screw 49 and a spring 50, arranged between the two, serve to constitute plates 45 and 48 as a bell crank with angularly adjustable arms. A suitable opening 51 is provided in the casing for access to the adjusting screw 49.

The pivots 35 and 46 are rigid to the box, but through an intermediate reinforcing member 52. Said member is secured to the box by spot welding and comprises an angular plate portion 53 carrying the pivot 35, and side bracket portions 54 carrying the pivot 46.

The registering mechanism comprises a horizontal face dial 55 arranged forward of the platform, and disposed preferably below its level. The dial is here shown as having a fixed scale 56 and a movable pointer 57, the pointer being provided with a pinion 58 beneath the dial. The dial is contained in a rimmed metal casing 59 to which are secured the moving parts of the registering mechanism. This comprises chiefly a bell crank or plate member 60 pivoted at 61 to the casing 59. The sides of the plate form vertical strips or flanges 62 and 63. The strip 62 forms the pivot by the provision of a turned over end 64. The strip 62 is extended in the other direction providing another pivot 65 for an integral gear segment 66, having its center at 61.

A spring 67 continually presses the gear segment against the pinion 58. The strip or flange 63 at its extremity provides a pivot 68. A link 69 extends from pivot 68 to plate 48 where it is pivotally held at 70. Extending from the strip 63 to the plate 48 substantially parallel with the link 69 is a tensioning means to prevent lost motion. This is shown as a weight 71 suspended by chains 72 and 73. Usually, when scales are assembled, the springs therein are adjusted to have the required tension factor. Where a number of springs cooperate in the scale, such an adjustment becomes a time-consuming operation adding to the cost of the scale. To avoid this difficulty, the scale described permits dispensing with this operation. Before assembly each spring is given approximately the required tension factor by a rough adjustment, accuracy being dispensed with. In the present instance the approximate adjustment is made by means of the suspension hooks 37ª and the washer 37ᵇ. After assembly no change is required in the adjustment. The six springs function together giving nearly the required tension factor. By varying the ratio of the unit weight displacement to the indicating pointer displacement accurate registration may be obtained. This is provided for by varying the lever arm of application of link 69 to the bell crank 60. By providing the strip 63 extending from the bell crank or plate 60, it is possible to bend the same to shorten its lever arm 63—61, thereby to effect an adjustment. A suitable key-tool is used to accomplish this in the factory, so that by this one operation, the factory adjustment is readily made, permitting the elimination of a complicated adjusting operation involving the several springs. Where six springs are used it is obvious that considerable labor-saving results in the manufacture and assembly. The zero adjustment is then effected by means of adjusting screw 49.

The secondary parallelogram 30—31—47—46 may be dispensed with, in the present rigid embodiment of the scale. In such a case the pivot 47 will be rigid with the frame 25. But for the purpose of accurate registration in case of unequal deflection of the two ends of the main frame, the described construction maintains the link 43 vertical, thereby giving accurate registration.

I claim as my invention:

1. A scale mechanism comprising, in combination, a box, a weighing frame within the box, a platform supported by said frame non-adjustable spring means supporting the frame at each end thereof, a registering mechanism associated with the box, positive translating means connecting the weighing frame to the registering mechanism, the translation of said means being dependent upon the weight on the platform and the tension of the springs, and means to vary the lever arm of application of the translating means to the registering mechanism.

2. A scale mechanism comprising, in combination, a box, a weighing frame within the box, a platform supported by said frame outside the box, a plurality of non-adjustable spring means suspending said frame from the box, said spring means being connected to said frame at a plurality of points, means to hold said frame vertically in the box, a registering mechanism including a scale associated with the box, positive translating means from the frame to the registering mechanism, and means to vary the ratio of the movements of the translating means and the registering mechanism to adjust the scale of the registering mechanism to the tension of the springs.

3. A scale mechanism comprising, in combination, a casing, a substantially rectangular weighing frame in said casing, spring means suspending said frame at each end from the casing, a link frame pivoted to the bottom of the weighing frame and to the casing, a link member parallel to said link frame pivoted to the top of said frame and to the casing, whereby said links hold the weighing frame vertical, a weighing platform on said weighing frame, and means connected to the center of said weighing frame to register the displacement thereof.

4. A weighing mechanism comprising, in combination, a movable weighing member, a plurality of non-adjustable springs supporting said member, a registering dial, registering means connected to the movable member to record the displacement on the dial, and a positive connection between said member and said registering means, said means being adapted for adjustment of the ratio of relative movements of the weighing member and the registering means.

5. A weighing scale comprising, in combination, a weighing member, means movable to support said member in a vertical position, a bell crank moved by said member, a registering mechanism moved by the bell crank, means in the bell crank to adjust the angularity of its arms, and means in the registering mechanism to vary the ratio of movement of the bell crank to the movement of the registering mechanism.

6. In a weighing scale, in combination, with a member therein moved by a weight on the scale, a registering mechanism comprising a pivoted indicator, a pinion therefor, a pivoted bell crank, a gear segment secured to the bell crank and centered at the bell crank pivot, and means to press said gear segment into mesh with the pinion, the movable member being connected to the bell crank.

7. In a weighing scale having a movable member operated by a displacement of the weighing mechanism, a registering mechanism including a bell crank, a non-radial projection on said bell crank, the movable member being secured to the end of said projection, and the projection being adapted for bending to vary the lever arm to effect a working adjustment of the registering mechanism to the weighing mechanism.

8. In a weighing scale, the combination of two members, a link pivoted between said two members, and contractile tensioning means between said two members to prevent lost motion in the linkage.

9. In a weighing scale, the combination of two members, a substantial horizontal link pivoted between said two members, a single weight suspended from each of said members, and a non-vertical suspending means from each member to the weight whereby to fix the linkage against lost motion.

10. A weighing scale comprising, in combination, a rectangular box casing, a registering dial on the top face of said box at one end, means projecting through the box top at the other end, a platform carried by said means, said platform being disposed above the dial and arranged to expose the dial, a vertical frame within the box carrying said projecting means, spring suspensions at each end of said frame, parallelogram members to hold said frame vertically movable, a vertical bell crank moved by the frame, a link horizontally moved by said vertical bell crank, and means to adjust the angularity of said bell crank, and registering mechanism operated by said link to register on the dial.

11. A registering mechanism having, in combination, a pivoted plate, registering means operated by moving said plate, a strip perpendicular to said plate, said plate being rigid thereto, the strip having a length projecting freely and substantially normal to a radius through the plate pivot, a plate moving link pivoted to said extending length to cause registration, said length being adapted for bending to vary the lever arm of application of said link whereby to adjust the ratio of motion of the plate to the motion of the link.

12. In a weighing scale, a registering mechanism comprising, in combination, a flat plate, strip like flanges on said plate formed by bending the edges thereof, one of said strips being bent to form a pivot for the plate, one of said strips being bent to form another pivot, a toothed member pivoted at the second pivot, a pointer pinion moved by said toothed member, means pressing said toothed member continuously in one direction against said pinion, one of said strips being severed from the plate at a lateral edge and being substantially normal radially to a line through the first mentioned plate-pivot, whereby to permit bending of the strip toward and away from said plate-pivot, and a movable member pivoted to said strip to move the registering mechanism.

13. A weighing scale comprising, in combination, a casing, a vertically supported weighing frame, a platform carried by said frame, a second frame pivoted to the first frame and to the casing, a third member pivoted to the first frame and the casing in parallel relationship to the second frame, a cross bar at each end of the first frame, and springs tensioned between each of said cross bars and the casing.

14. In a weighing mechanism, a vertically supported frame rectangular in shape, projections upwardly from said frame for carrying a platform thereon, cross bars at the lower part of said frame for suspending the frame resiliently, pivotal connections at the bottom of said frame for a guiding member, a pivotal connection at the top of said frame for a guiding member, and a pivotal connection vertically central of said frame for a motion transmitting member.

15. In a weighing scale having a weighing mechanism and a registering mechanism, a bell crank disposed between said mechanisms, one arm of the bell crank being moved by the weighing mechanism and the other arm moving the registering mechanism, said bell crank comprising two members having a common pivot, a projection from one plate substantially parallel with the other plate, means tending to separate said members in their hinged relation, and an adjusting screw between the substantially parallel portions for varying the angularities of the arms of the bell crank, whereby to set the registering mechanism with reference to the weighing mechanism in a predetermined position.

In testimony whereof, I have hereunto affixed my signature.

MARIUS H. HANSEN.